US011449766B2

(12) United States Patent
Tang et al.

(10) Patent No.: US 11,449,766 B2
(45) Date of Patent: Sep. 20, 2022

(54) INVITATION BEHAVIOR PREDICTION METHOD AND APPARATUS, AND STORAGE MEDIUM

(71) Applicants: TSINGHUA UNIVERSITY, Beijing (CN); TENCENT TECHNOLOGY (SHENZHEN)COMPANY LIMITED, Guangdong (CN)

(72) Inventors: Jie Tang, Beijing (CN); Jiezhong Qiu, Beijing (CN); Yujie Qian, Beijing (CN); Bo Chen, Guangdong (CN); Hao Ye, Guangdong (CN); Debing Liu, Guangdong (CN); Yufei Zheng, Guangdong (CN)

(73) Assignees: TSINGHUA UNIVERSITY, Beijing (CN); TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 825 days.

(21) Appl. No.: 16/387,705

(22) Filed: Apr. 18, 2019

(65) Prior Publication Data

US 2019/0244115 A1    Aug. 8, 2019

Related U.S. Application Data

(63) Continuation of application No. PCT/CN2018/085385, filed on May 2, 2018.

(30) Foreign Application Priority Data

May 16, 2017    (CN) .......................... 201710345002.8

(51) Int. Cl.
*G06N 5/02*        (2006.01)
*G06F 16/28*        (2019.01)
(Continued)

(52) U.S. Cl.
CPC ............. *G06N 5/02* (2013.01); *G06F 16/285* (2019.01); *G06N 5/022* (2013.01); *G06Q 10/04* (2013.01); *G06Q 50/00* (2013.01); *G06Q 50/01* (2013.01)

(58) Field of Classification Search
CPC .......... G06N 5/02; G06N 5/022; G06N 7/005; G06N 20/10; G06F 16/285; G06Q 10/04; G06Q 50/00; G06Q 50/01
See application file for complete search history.

(56) References Cited

U.S. PATENT DOCUMENTS 11,323,540 B1*   5/2022   Klein .................... H04L 67/60
2013/0013541 A1*   1/2013   Juan .................... H04L 67/306
                                                    706/12

(Continued)

FOREIGN PATENT DOCUMENTS

CN       102044009 A       5/2011
CN       1060225808 A      10/2016

OTHER PUBLICATIONS

Yang, et al., "Activity Lifespan: An Analysis of User Survival Patterns in Online Knowledge Sharing Communities", Proceedings of the Fourth International AAAI Conference on Weblogs and Social Media, 2010.

(Continued)

*Primary Examiner* — Joe Chacko
(74) *Attorney, Agent, or Firm* — Arentfox Schiff LLP

(57) ABSTRACT

In a method for invitation behavior prediction, group behavior feature information of a first user of a group is obtained. In addition, group relationship feature information of a second user is obtained. Further, group architecture information of the group, the group behavior feature information of the first user, and the group relationship feature information of the second user are input to an invitation prediction model, to obtain a target member user and a candidate (Continued)

invitation user of the target member user. The invitation prediction model is obtained by training the invitation prediction model based on a plurality of sample groups in a training set, and group relationship feature information of associated users of member users in the plurality of sample groups. Invitation prediction information is sent to the target member user to prompt the target member user to add the candidate invitation user to the group.

20 Claims, 5 Drawing Sheets

(51) Int. Cl.
*G06Q 50/00* (2012.01)
*G06Q 10/04* (2012.01)

(56) References Cited

U.S. PATENT DOCUMENTS

| | | | |
|---|---|---|---|
| 2013/0124294 A1 | 5/2013 | Peak et al. | |
| 2013/0290414 A1* | 10/2013 | Rait | G06Q 50/01 709/204 |
| 2014/0047023 A1* | 2/2014 | Baldwin | H04L 67/535 709/204 |
| 2014/0067817 A1* | 3/2014 | Seth | G06Q 50/01 707/E17.046 |
| 2014/0067826 A1* | 3/2014 | Jackson | G06Q 50/01 707/748 |
| 2015/0256503 A1* | 9/2015 | Baldwin | G06N 7/005 709/204 |
| 2022/0120574 A1* | 4/2022 | Simpson | G06Q 50/30 |

OTHER PUBLICATIONS

Ducheneaut, et al., "The Life and Death of Online Gaming Communities: A Look at Guilds in World of Warcraft", CHI 2007 Proceedings Games, 2007.
Backstrom, et al., "Group Formation in Large Social Networks:Membership, Growth, and Evolution", Cornell University, 2006.
Butler, "Membership Size, Communication Activity, and Sustainability: A Resource-Based Model of Online Social Structures", Information Systems Research, 2001.
Ribeiro, "Modeling and Predicting the Growth and Death of Membership-based Websites", Carnegie Mellon University, 2014.
Palla, et al., "Quantifying social group evolution", Nature, 2007.
Kairam, et al., "The Life and Death of Online Groups: Predicting Group Growth and Longevity", Stanford University, 2012.
Kloumann, et al., "The Lifecycles of Apps in a Social Ecosystem", arXiv:1503.06870v1, 2015.
Sun, et al., "Co-Evolution of Multi-Typed Objects in Dynamic Star Networks", IEEE Transaction on Knowledge and Data Engineering, 2013.
International Search Report dated Jul. 23, 2018 in Application No. PCT/CN2018/085385 with English translation, 5 pages.
Chinese Written Opinion dated Jul. 23, 2018 in Application No. PCT/CN2018/085385 (No English translation), 3 pages.

* cited by examiner

INVITATION BEHAVIOR PREDICTION METHOD AND APPARATUS, AND STORAGE MEDIUM

RELATED APPLICATION

This application is a continuation of International Application No. PCT/CN2018/085385, filed on May 2, 2018, which claims priority to Chinese Patent Application No. 201710345002.8, filed on May 16, 2017. The entire disclosures of the prior application are hereby incorporated by reference in their entirety.

FIELD OF THE TECHNOLOGY

This application relates to the field of Internet technologies, and in particular, to an invitation behavior prediction method and apparatus, and a storage medium.

BACKGROUND OF THE DISCLOSURE

With the advent and rise of social applications such as WeChat and EasyChat, communication manners between people change greatly. To promote communication between users and establishment of interpersonal relationships, when using social applications, users may usually create groups based on the social applications, and invite users having the same hobby or the same task to the same groups, to facilitate communication. The groups bring stronger sense of community and sense of connection to the users, and improve the attraction of the social applications to the users.

In the related technology, when creating a group, a user may view associated users of the user in a contact list, select, from the associated users, associated users who may be interested in the to-be-created group, and invite the associated users, to complete the creation of the group. Moreover, if it is determined that other associated users may also be interested in the group, member users in the group may invite the other associated users, so that the other associated users enter the group.

At present, after the group is created, due to busy work or life, member users currently included in the group may forget to maintain the group, such as, update members in the group, and the social application may also not remind the user, making the social application not intelligent enough. Therefore, to improve the intelligence of the social application, so as to maximize the utilization of an interactive function provided by the group, an invitation behavior prediction method is urgently needed.

SUMMARY

This application provides an invitation behavior prediction method and apparatus, and a storage medium, to resolve the problem that a social application is not intelligent enough because members in a group cannot be updated automatically.

According to an aspect of the disclosure, a method and an apparatus for invitation behavior prediction are provided. In the disclosed method that is implemented by the apparatus for example, group behavior feature information of a first user is obtained. The group behavior feature information includes a group membership duration of the first user in a group of member users and an invitation time interval of the first user. The invitation time interval is a time interval between a time at which a most recent invitation is made by the first user and a current time. In addition, group relationship feature information of a second user is obtained. The second user is associated with the first user, and the group relationship feature information is indicative of an association between the second user and the group. Further, group architecture information of the group, the group behavior feature information of the first user, and the group relationship feature information of the second user are input to an invitation prediction model, to obtain a target member user and a candidate invitation user of the target member user. The invitation prediction model is obtained by training the invitation prediction model based on a plurality of sample groups in a training set, and group relationship feature information of associated users of member users in the plurality of sample groups. The group architecture feature information of the group includes a user number of the member users in the group and correlations of the users in the group. Invitation prediction information is subsequently sent to the target member user. The invitation prediction information is configured to prompt the target member user to add the candidate invitation user of the target member user to the group.

In some embodiments, the group architecture feature information of the group and the group behavior feature information of the first user is input to a first prediction submodel, to obtain the target member user. The first prediction submodel is obtained by training the first prediction submodel based on group architecture feature information of the plurality of sample groups in the training set and group behavior feature information of first sample users in the plurality of sample groups.

In some embodiments, the group architecture feature information of the group, and the group relationship feature information of the second user associated with the first user in the group is input to a second prediction submodel, to obtain the candidate invitation user. The second prediction submodel is obtained by training the second prediction submodel based on the group architecture feature information of the plurality of sample groups in the training set and group relationship feature information of second sample users associated with the plurality of sample groups. Each of the second sample users is an associated user of one of the first sample users.

In some embodiments, the group architecture feature information of the plurality of sample groups is obtained based on a user number of a second sample user set that is associated with the member users in the plurality of sample groups and associations among the first sample users in the plurality of sample groups. Further the group behavior feature information of the first sample users is determined based on group membership durations and invitation time intervals of the first sample users. The first prediction submodel is subsequently trained based on the group architecture feature information of the plurality of sample groups and the group behavior feature information of the first sample users to define the first prediction submodel.

In some embodiments, the user number of the second sample user set is extracted. The second sample user set is associated with the member users in the plurality of sample groups. In addition, an association number of the associations of the first sample users in the plurality of sample groups is extracted. Further, a group number of first user groups and a group number of second user groups in the plurality of sample groups are extracted. In the first user groups, each of the first user groups includes three first sample users in the plurality of sample groups when the plurality of sample groups is created. Each of the first user groups includes two pairs of the first sample users that are associated with each other and one pair of the first sample users that is not associated with each other. In the second user groups, each of the second user groups includes three first sample users in the plurality of sample groups when the plurality of sample groups is created. Any two of the three first sample users in one of the second user groups have an association with each other.

A group number of third user groups and a group number of fourth user groups in the plurality of sample groups are subsequently extracted. Each of the third user groups includes three first sample users in the plurality of current sample groups. Each of the third user groups includes two pairs of first sample users that are associated with each other and one pair of first sample users that is not associated with each other. In the fourth user groups, each of the fourth user groups includes three first sample users in the plurality of sample groups. Any two of the three first sample users in one of the fourth user groups have an association with each other.

A clustering coefficient of the plurality of sample groups is then determined. The clustering coefficient is a ratio of the group number of the fourth user groups and a sum of the group number of the third user groups and the group number of the fourth user groups. In addition, the group architecture feature information of the plurality of sample groups is determined based on the user number of the second sample user set, the group number of the first user groups, the group number of the second user groups, the group number of the third user groups, the group number of the fourth user groups, and the clustering coefficient.

In some embodiments, invitation behaviors among the first sample users in the plurality of sample groups is determined, and cascade feature information of the plurality of sample groups is generated. The cascade feature information indicates an invitation relationship in the plurality of sample groups. Further, statistics of user personal feature information of the first sample users in the plurality of sample groups is collected, to obtain user statistics feature information of the plurality of sample groups.

In some embodiments, the group behavior feature information of the first sample users is determined based on a user number of historically invited users of the first sample users that are in the plurality of sample groups to which the first sample users belong. In addition, the group behavior feature information of the first sample users is determined based on a publication number of published messages of the first sample users that are in the plurality of sample groups to which the first sample users belong.

In some embodiments, local feature information of the first sample users is obtained based on associated users of the first sample users and relationships between the associated users of the first sample users and the plurality of sample groups to which the first sample users belong.

In some embodiments, the local feature information of the first sample users is determined based on a user number of a group of the first sample users that belong to the plurality of sample groups and have associated users, and a ratio of the user number of the group of the first sample users and the user number of the plurality of sample groups.

In some embodiments, the local feature information of the first sample users is determined based on a user number of the second sample users that do not belong to the plurality of sample groups and are associated with the first sample users and a ratio of the user number of the second sample users and a user number of associated users of the first sample users.

In some embodiments, the local feature information of the first sample users is determined based on a user number of first specified users in the associated users of the first sample users. Each of the first specified users is one of the second sample users and has a preset number of associated users belonging to the plurality of sample groups to which the first sample users belong.

In some embodiments, the local feature information of the first sample users is determined based on an association number of associations between second specified users in the associated users of the first sample users and the users in the plurality of sample groups to which the first sample users belong. The second specified users are associated users of the first sample users and the second specified users do not belong to the plurality of sample groups to which the first sample users belong.

In some embodiments, the local feature information of the first sample users is determined based on depth information of the cascade feature information of the plurality of sample groups to which the first sample users belong.

In some embodiments, the group architecture feature information of the plurality of sample groups is obtained based on a user number of a second sample user set that is associated with the member users of the plurality of sample groups and associations of the first sample users in the plurality of sample groups. Each of the second sample users being an associated user of one of the first sample users.

Further, the group relationship feature information of the second sample users is determined based on a first user number of first associated users of the second sample users, a second user number of second associated users of the second sample users, and a block number of connecting blocks that are formed by third associated users of the second sample users. The first associated users are in the plurality of sample groups to which the first sample users belong. The second associated users are identified as active invited users in the plurality of sample groups to which the first sample users belong. The third associated users are in the plurality of sample groups to which the first sample users belong.

Subsequently, the second prediction submodel is trained based on the group architecture feature information of the plurality of sample groups, and the group relationship feature information of the second sample users to define the second prediction submodel.

In some embodiments, user personal characteristic information of the second sample users is obtained. User common characteristic information of the second sample users are determined based on the user personal feature information of the second sample users and the user personal characteristic information of the first sample users in the plurality of sample groups. The user common feature information is indicative of a similarity of the personal characteristic information.

According to another aspect, a non-transitory computer readable storage medium is provided. The medium stores instructions which when executed by at least one processors cause the at least one processor to perform any of the methods for invitation behavior prediction which are mentioned above.

Beneficial effects of the technical solutions provided in the embodiments of this application may include:

An invitation behavior is predicted by using an invitation prediction model trained based on features that can represent relationships between member users in a group, invitation behaviors of the member users, and the like, so that the social application is more intelligent, and the utilization of an interactive function provided by the group in the social application is maximized.

It should be understood that the above general descriptions and the following detailed descriptions are merely for exemplary and explanatory purposes, and are not intended to limit the scope of the present disclosure.

BRIEF DESCRIPTION OF THE DRAWINGS

The accompanying drawings, which are incorporated herein and constitute a part of this specification, illustrate embodiments consistent with this application and, together with the specification, serve to explain the principles of this application.

DESCRIPTION OF EMBODIMENTS

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with this application. On the contrary, the implementations are merely examples of apparatuses and methods that are described in detail in the appended claims and that are consistent with some aspects of this application.

Before this application is explained and described in detail, an architecture of an implementation environment involved in the embodiments of this application is simply described first.

Figure 1:
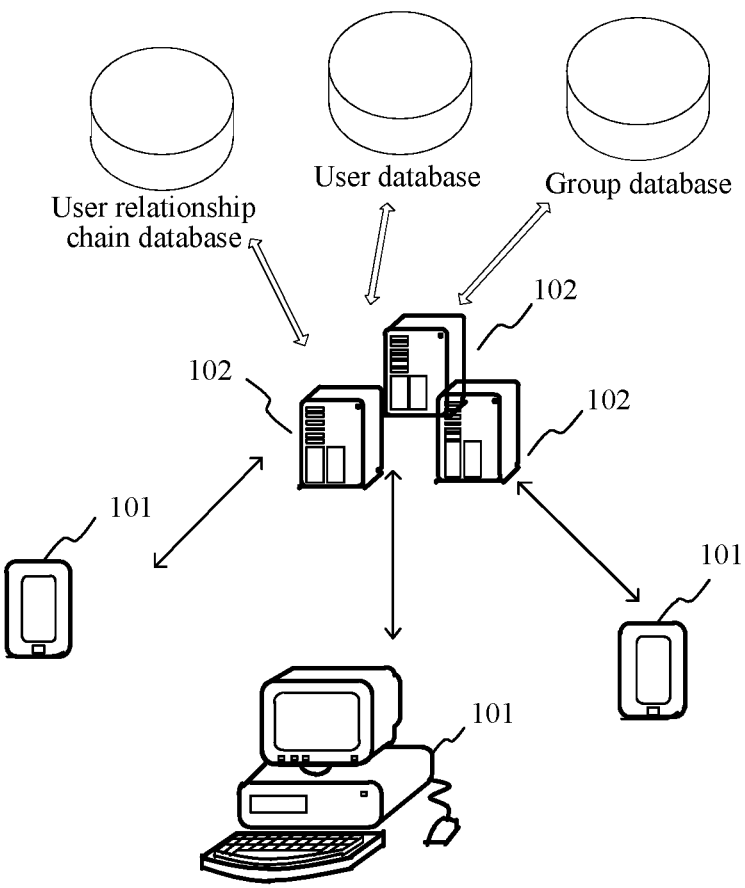
FIG. 1 is an architectural diagram of an implementation environment according to an exemplary embodiment.

Referring to FIG. 1, the implementation environment includes a plurality of terminals 101, and at least one server 102. The plurality of terminals 101 is connected to the server 102 through a wireless or wired network, and the plurality of terminals 101 may be electronic devices that can access the server 102. The electronic device may be a desktop computer, a laptop portable computer, a tablet computer, a smartphone, an e-book reader, a computer device specialized in purchase, or the like. The server 102 may be one or more website servers, and configured to perform services such as interactions between users and group sessions for the terminal 101. Certainly, the server 102 may further perform services such as personal status posting and webpage browsing for the terminal 101. In this implementation environment, a terminal user may obtain services of the server 102 by means of registering on the server 102 or mounting a client. This is not limited in the embodiments of this application.

For the server 102, the server 102 may further have at least one database, used to store user relationship chains used to represent association relationships between users, user data, group data, and the like, thereby providing services that are more interactive.

Figure 2:
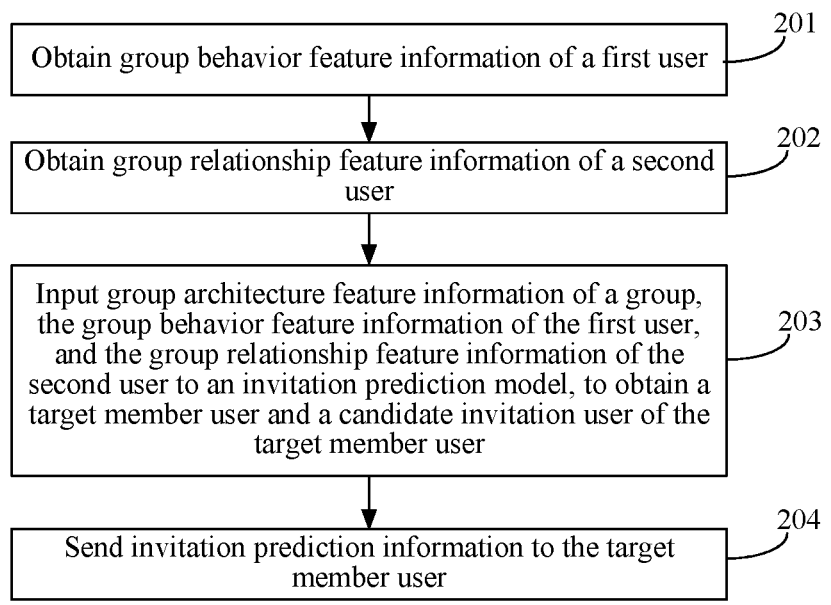
FIG. 2 is a flowchart of an invitation behavior prediction method according to an exemplary embodiment.

FIG. 2 is a flowchart of an invitation behavior prediction method according to an exemplary embodiment. As shown in FIG. 2, an example in which the method is applied to a terminal is used for description, and the method includes the following steps:

201. Obtain group behavior feature information of a first user.

Optionally, the group behavior feature information includes group staying duration and an invitation time interval of the first user, the invitation time interval being a time interval between the time at which an invitation behavior of the first user occurred last time and the currently predicted time, and the first user being a member user in a to-be-predicted group.

Optionally, the group staying duration is duration since the first user joins in the to-be-predicted group.

202. Obtain group relationship feature information of a second user.

The second user is an associated user of the first user, and the group relationship feature information is used to indicate an association situation between the second user and the group.

Optionally, that the second user is an associated user of the first user means that there is an association relationship between the second user and the first user. For example, if the second user and the first user are in a friend relationship in a social application, the second user is an associated user of the first user.

203. Input group architecture feature information of a group, the group behavior feature information of the first user, and the group relationship feature information of the second user to an invitation prediction model, to obtain a target member user and a candidate invitation user of the target member user.

Optionally, the invitation prediction model is obtained by at least performing training based on a plurality of sample groups in a training set and group relationship feature information of associated users of member users in the plurality of sample groups.

Optionally, the group architecture feature information includes association relationships between the quantity of users and the users.

204. Send invitation prediction information to the target member user.

Optionally, the invitation prediction information is used to prompt the target member user to add the candidate invitation user of the target member user to the group. Optionally, the invitation prediction information is used to prompt the target member user to add the foregoing candidate invitation user to the foregoing to-be-predicted group.

In conclusion, in the invitation behavior prediction method provided in this embodiment, an invitation behavior is predicted by using an invitation prediction model, where the invitation prediction model is obtained by performing training by using feature information, and the feature information can represent relationships between member users in a group and invitation behaviors of the member users, so that the social application is more intelligent, and the utilization of an interactive function provided by the group in the social application is maximized.

Figure 3:
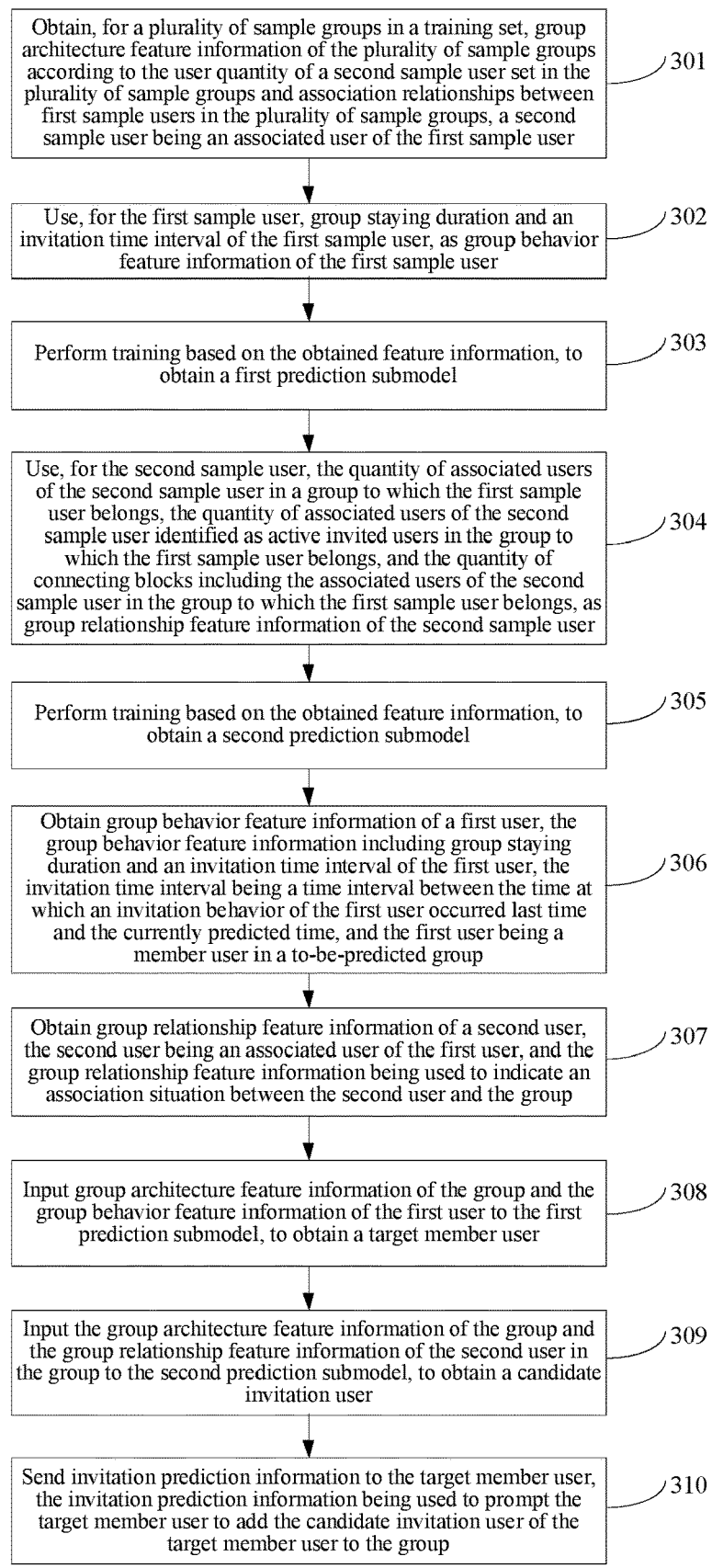
FIG. 3 is a flowchart of an invitation behavior prediction method according to an exemplary embodiment.

FIG. 3 is a flowchart of an invitation behavior prediction method according to an exemplary embodiment. As shown in FIG. 3, an example in which the method is applied to a mobile terminal is used for description, and the method includes the following steps:

301. Obtain, for a plurality of sample groups in a training set, group architecture feature information of the plurality of sample groups according to the user quantity of a second sample user set in the plurality of sample groups and association relationships between first sample users in the plurality of sample groups, a second sample user being an associated user of the first sample user.

In this embodiment of this application, during obtaining of the training set, a plurality of groups maintained by a social application platform may be obtained by using the social application platform, as sample groups. During the obtaining, member users of the plurality of groups may be obtained as first sample users, and associated users of the member users may be obtained as second sample users based on user relationship chains of the member users.

It should be noted that, the training set may be obtained based on the same social application platform. Because functions provided by groups are similar for a social application, user behaviors generated based on the functions are also similar. Therefore, performing model training by using groups from the same social application platform has a more targeted instructive effect on prediction in the same social application.

In an actual scenario, to seek for the commonality of group invitation behaviors of a plurality of social application platforms, during obtaining of a training set, groups from a plurality of social application platforms may also be obtained, to train a relatively common model, to adapt to the plurality of social application platforms. Social application platforms from which groups are specifically obtained are not limited in the embodiments of this application. Certainly, because of characteristics of different social application platforms, relationships between first sample users and second sample users of the social application platforms may be different. For example, if a sample group is a sample group in an instant communication application platform, a second sample user may be a friend of a first sample user; and if a sample group is a sample group in a micro blog application platform, a second sample user may be a follower or a subscriber of a first sample user. Which association relationship is specifically is not limited in the embodiments of this application.

Figure 4:
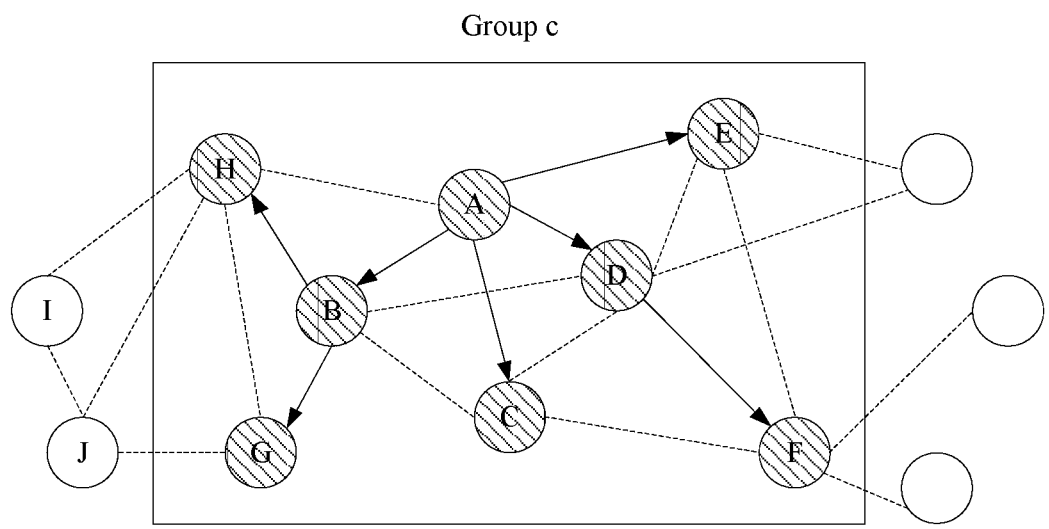
FIG. 4 is a schematic diagram of an invitation behavior prediction method according to an exemplary embodiment.

Referring to FIG. 4, assuming that the sample group is group c, the shadow points in FIG. 4 represent first sample users in group c, the white points represent second sample users, and the segments (including dotted lines and arrows) represent relationships between the sample users. The arrow represents an invitation relationship existing between the sample users. Using an arrow orientation between B and H as an example, the arrow orientation represents that B invites H to enter group c. It should be noted that, in this embodiment of this application, it is defaulted that only sample users who are associated users of each other can perform invitation. However, other sample users can be allowed to perform invitations in other embodiments.

It should be noted that, as basic data during prediction, the second sample user set can provide reference to the entire prediction process. Therefore, the user quantity of the second sample user set of each sample group needs to be obtained. For example, for group c, the first sample users in group c are u, and the second sample users are v. Therefore, for group c, a set fringe (c) may exist, and the set fringe (c) includes a second sample user that is not in group c and that is in an association relationship with a first sample user in group c, that is, the set fringe (c) is a second sample user set of the sample group, so that when the user quantity of the second sample user set of the sample group is extracted, only the user quantity in the set fringe (c) needs to be obtained in certain embodiments.

Optionally, the user quantity of a second sample user set of a plurality of sample groups is extracted; the quantity of association relationships existing between first sample users in the plurality of sample groups is extracted; the quantity of first user groups and the quantity of second user groups in the plurality of sample groups are extracted; the quantity of third user groups and the quantity of fourth user groups in the plurality of sample groups are extracted; an aggregation (or clustering) coefficient of the plurality of sample groups is determined; and the user quantity, the quantity of first user groups, the quantity of second user groups, the quantity of third user groups, the quantity of fourth user groups, and the aggregation coefficient are used as group architecture feature information of the sample group.

It should be further noted that, the association relationships between member users in the group may represent internal connections between the member users. When the association relationships between the first sample users in the plurality of sample groups are extracted, the quantity of first user groups, the quantity of second user groups, the quantity of third user groups, the quantity of fourth user groups, and the aggregation coefficient of the plurality of sample groups may be separately extracted. The method for extracting the quantity of first user groups, the quantity of second user groups, the quantity of third user groups, the quantity of fourth user groups, and the aggregation coefficient may be described in the following step (1) to step (5):

(1) Obtaining of the Quantity of First User Groups.

The first user group is a user group including three first sample users in a plurality of sample groups when the plurality of sample groups is created, and two pairs of first sample users between the three first sample users in the first user group have an association relationship and one pair has no association relationship. The quantity of first user groups is also the open triangle quantity existing when the sample group is created, and different from a closed triangle, an open triangle is a closed triangle short of one edge. Referring to FIG. 4, sample user B, sample user C, and sample user G may form a first sample user group, that is, when group c is created, sample user B and sample user G have an association relationship, and sample user B and sample user C have an association relationship, but sample user G and sample user C have no association relationship.

(2) Obtaining of the Quantity of Second User Groups.

The second user group is a user group including three first sample users in a plurality of sample groups when the plurality of sample groups is created, and any two of the three first sample users in the second user group have an association relationship. The quantity of second user groups is the closed triangle quantity existing when the sample group is created. Referring to FIG. 4, sample user A, sample user B and sample user C may form a second sample user group, that is, when group c is created, sample user A, sample user B, and sample user C have an association relationship.

(3) Obtaining of the Quantity of Third User Groups.

The third user group is a user group including three first sample users in the plurality of current sample groups, and two pairs of first sample users between the three first sample users in the third user group have an association relationship and one pair has no association relationship. The third user group is the open triangle quantity currently existing in the sample group, and the process of determining the third user group is consistent with the process of determining the first user group. Details are not described herein again.

(4) Obtaining of the Quantity of Fourth User Groups.

The fourth user group is a user group including three first sample users in the plurality of current sample groups, and any two of the three first sample users in the second user group have an association relationship. The fourth user group is the closed triangle quantity currently existing in the sample group, and the process of determining the fourth user group is consistent with the process of determining the second user group. Details are not described herein again.

(5) Obtaining of the Aggregation Coefficient.

The aggregation coefficient is the proportion of the quantity of fourth user groups in the sum of the quantity of third user groups and the quantity of fourth user groups, that is, the proportion of the closed triangle quantity existing in the current sample group in the sum of the closed triangle quantity and the open triangle quantity existing in the current sample group. For example, if the quantity of third user groups currently existing in the sample group is X, and the quantity of fourth user groups currently existing in the sample group is Y, the aggregation coefficient is Y/(X+Y).

After the quantity of first user groups, the quantity of second user groups, the quantity of third user groups, the quantity of fourth user groups, and the aggregation coefficient are determined, the quantity of first user groups, the quantity of second user groups, the quantity of third user groups, the quantity of fourth user groups, and the aggregation coefficient may be used as association relationships between the first sample users in the plurality of sample groups, and the user quantity and the association relationships may be used as the group architecture feature information, to perform the model training process subsequently.

It should be noted that, to make the first prediction submodel obtained through training more precise and accurate, the group architecture feature information may further include cascade feature information and/or user statistics feature information. When the cascade feature information and the user statistics feature information are obtained, the following method for obtaining cascade feature information and the following method for obtaining user statistics feature information may be used.

(1) The Method for Obtaining Cascade Feature Information.

In this embodiment of this application, the cascade feature information is used to indicate an invitation relationship in the sample group. When cascade feature information of the plurality of sample groups is generated, an invitation behavior between the first sample users in the plurality of sample groups needs to be determined. When the invitation behavior between the first sample users in the plurality of sample groups is determined, a cascade tree in the plurality of sample groups may be first determined, and the invitation behavior between the first sample users in the plurality of sample groups may be determined based on the cascade tree. The cascade feature information may be the user quantity of the first sample users, the size of a subtree of the cascade tree, the quantity of first sample users in a cascade tree whose depth is k, and an average distance between first sample users in the cascade tree, where k is a positive integer ranging from 1 to 9. When the average distance between the first sample users in the cascade tree is calculated, calculation may be performed according to the following formula 1, $$WienerIndex = \frac{1}{n(n-1)} \sum_{i=1}^{n} \sum_{j=1}^{n} d_{ij} \qquad \text{formula 1}$$

where $d_{ij}$ is the distance between sample user i and sample user j in a cascade tree, Wiener Index is an average distance between any two first sample users in the cascade tree, and n is the quantity of first sample users.

Figure 5:
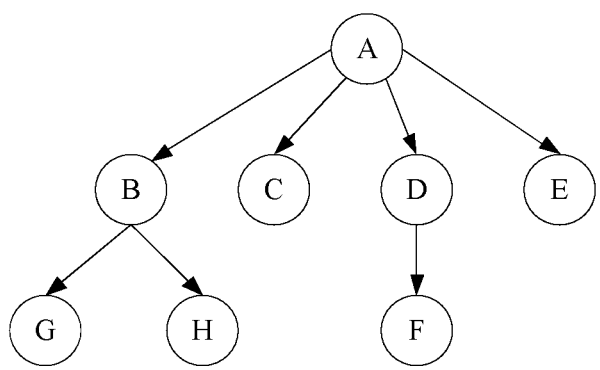
FIG. 5 is a schematic diagram of an invitation behavior prediction method according to an exemplary embodiment.

Referring to the cascade tree shown in FIG. 5, as can be known from the cascade tree, sample user A invites sample user B, sample user C, sample user D, and sample user E, then, sample user B invites sample user G and sample user H, and sample user D invites sample user F, so that the cascade feature information may be obtained based on the cascade tree. The user quantity of first sample users is 8; the size of a subtree of a cascade tree whose root is B is 3, the size of a subtree of a cascade tree whose root is D is 1; the quantity of first sample users whose depth is 1 is 1, that is, sample user A; the quantity of first sample users whose depth is 2 is 4, that is, sample user B, sample user C, sample user D, and sample user E; the quantity of first sample users whose depth is 3 is 2, that is, sample user F and sample user G; and an average distance between first sample users in a cascade tree generated by applying formula 1 is 31/14.

(2) The Method for Obtaining User Statistics Feature Information.

In this embodiment of this application, when the user statistics feature information of the plurality of sample groups is extracted, statistics about user personal feature information of the first sample users in the plurality of sample groups needs to be collected. Referring to the following table 1, the user statistics feature information may include the nationality distribution of the first sample users, the absolute quantity of the user quantity of the first sample users corresponding to nationalities, the gender distribution of the first sample users, the absolute quantity of the user quantity of the first sample users corresponding to genders, the age distribution of the first sample users, and the absolute quantity of the user quantity of the first sample users corresponding to ages, and the nationality information entropy of the first sample users, the age information entropy of the first sample users, and the gender information entropy of the first sample users are generated according to the foregoing data, so that the nationality distribution of the first sample users, the absolute quantity of the user quantity of the first sample users corresponding to nationalities, the gender distribution of the first sample users, the absolute quantity of the user quantity of the first sample users corresponding to genders, the age distribution of the first sample users, the absolute quantity of the user quantity of the first sample users corresponding to ages, the nationality information entropy of the first sample users, the age information entropy of the first sample users, and the gender information entropy of the first sample users may be used as the user statistics feature information.

TABLE 1

| | Group architecture feature information |
|---|---|
| Group architecture feature information | The user quantity (sizes of group c and the set fringe (c)) |
| | The quantity of first user groups (when group c is created, the open triangle quantity existing in group c) |
| | The quantity of second user groups (when group c is created, the closed triangle quantity existing in group c) |
| | The quantity of third user groups (the open triangle quantity currently existing in group c) |
| | The quantity of fourth user groups (the closed triangle quantity currently existing in group c) |
| | The aggregation coefficient (the proportion of the closed triangle quantity currently existing in the sample group in the sum of the closed triangle quantity and the open triangle quantity currently existing in the sample group) |
| Cascade feature information | The user quantity of first sample users |
| | The size of the subtree of the cascade tree |
| | The quantity of first sample users whose depth is k in the cascade tree |
| | The average distance between first sample users in the cascade tree |
| User statistics feature information | The nationality distribution of the first sample users |
| | The absolute quantity of the user quantity of the first sample users corresponding to nationalities |
| | The gender distribution of the first sample users |
| | The absolute quantity of the user quantity of the first sample users corresponding to genders |
| | The age distribution of the first sample users |
| | The absolute quantity of the user quantity of the first sample users corresponding to ages |
| | The nationality information entropy of the first sample users |
| | The age information entropy of the first sample users |
| | The gender information entropy of the first sample users |

It should be noted that, in this embodiment of this application, the group architecture feature information may be all feature information shown in Table 1, so that the user quantity, the quantity of first user groups, the quantity of second user groups, the quantity of third user groups, the quantity of fourth user groups, and the aggregation coefficient in the group architecture feature information may be selected as the group architecture feature information, or the cascade feature information and/or the user statistics feature information may be added to the group architecture feature information, or the cascade feature information and/or the user statistics feature information may be omitted. This is not specifically limited in this application.

202. Use, for a first sample user, group staying (or group membership) duration and an invitation time interval of the first sample user as group behavior feature information of the first sample user.

In this embodiment of this application, whether a user performs invitation after being added to a group or when a user performs invitation last time may be analyzed to obtain the rule of the user performing invitation behaviors within given time. Therefore, for the first sample user, the group staying duration and the invitation time interval of the first sample user may be used as the group behavior feature information of the first sample user. During obtaining of the invitation time interval, time T1 at which the first sample user invites other users to enter the group last time may be first obtained, and then, the current time T is obtained. (T−T1) is used as the invitation time interval. Time T1 at which the first sample user invites other users to enter the group last time may also be understood as time T1 at which the first sample user invites other users to enter the group last time.

In addition, whether a user is active or whether a user is willing to participate in a behavior such as invitation may be obtained by analyzing the quantity of member users in a group that are once invited by the user and the activity degree of the users in the group. Therefore, the group behavior feature information may further include the quantity of historically invited users of a first sample user in a sample group to which the first sample user belongs and/or the quantity of published messages of a first sample user in a sample group to which the first sample user belongs. During obtaining of the quantity of historically invited users and the quantity of published messages, the current time may be set to T, the quantity of historically invited users before time T that the first sample user invites to enter the sample group to which the first sample user belongs and the quantity of published messages of the first sample user until time T in the sample group to which the first sample user belongs are obtained.

In this embodiment of this application, the foregoing obtained group behavior feature information of the first sample user is actually some characteristics of the first sample user. In fact, some characteristics of associated users of the first sample user may also affect the invitation behavior of the first sample user. Therefore, before training is performed for the first prediction submodel based on the group architecture feature information and the group behavior feature information, local feature information of the first sample user may be further obtained. For the first sample user, the local feature information of the first sample user is obtained according to the associated users of the first sample user and relationships between the associated users of the first sample user and the group to which the first sample user belongs. For a specific process, refer to the following step (1) to step (5):

(1) Use the quantity of first users of the first sample user that have association relationships in the sample group to which the first sample user belongs and the proportion of the quantity of first users in the quantity of group users as the local feature information of the first sample user.

In this embodiment of this application, assuming that the first sample user is user u, and a sample group to which user u belongs is group c, the quantity of first users that are of associated users of user u and that are in group c, and the proportion of the quantity of first users in the quantity of group users in group c may be obtained, and the quantity of first users and the proportion may be used as the local feature information of the first sample user.

(2) Use the quantity of second users in the sample group to which the first sample user belongs and in which associated users of the first sample user do not exist and the proportion of the quantity of second users in the quantity of the associated users of the first sample user as the local feature information of the first sample user.

In this embodiment of this application, assuming that the first sample user is user u, and the sample group to which user u belongs is group c, the quantity of second users that are of associated users of user u and that are not in group c, and the proportion of the quantity of second users in the quantity of friends of user u may be obtained, and the quantity of second users and the proportion may be used as the local feature information.

(3) Use the quantity of first specified users in the associated users of the first sample user as the local feature information of the first sample user, the first specified user being a second sample user having a preset quantity of associated users in the sample group to which the first sample user belongs.

In this embodiment of this application, assuming that the first sample user is user u, and the sample group to which user u belongs is group c, a set fringe (c) exists for group c, and the set fringe (c) includes a second sample user that is not in group c and that is in an association relationship with a first sample user in group c. If the preset quantity is set to k, k is a positive integer ranging from 1 to 50, when the value of k is 1, it is determined that in the set fringe (c), the quantity of second sample users of one associated user in group c is used as the quantity of first specified users; and when the value of k is 2, it is determined that in the set fringe (c), the quantity of second sample users of two associated users in group c is used as the quantity of first specified users, and so on. The obtained quantity of first specified users is used as local feature information of the second sample user.

(4) Use the quantity of association relationships existing between a second specified user in the associated users of the first sample user and users in the sample group to which the first sample user belongs as the local feature information of the first sample user, the second specified user being an associated user of the first sample user and not belonging to the sample group to which the first sample user belongs.

In this embodiment of this application, assuming that the first sample user is user u, and the sample group to which user u belongs is group c, the quantity of association relationships existing between the second specified user and users in group c is obtained from the associated users of user u, as the local feature information, the second specified user being not in group c.

It should be noted that, in the associated users of user u, an associated user of user u in reality and a user in group c may be in an association relationship, but no association relationship is created in communication software. Therefore, the quantity of associated users of user u that are in this relationship may be estimated, to obtain the quantity of third specified users, and the proportion of the quantity of second specified users in the quantity of third specified users may be obtained and also used as the local feature information.

(5) Use depth information of the first sample user in cascade feature information of the sample group to which the first sample user belongs, as the local feature information of the first sample user.

In this embodiment of this application, assuming that the first sample user is user u, and the sample group to which user u belongs is group c, depth information of user u may be determined in a cascade tree of group c.

In this way, when training is performed based on the obtained feature information subsequently, the group behavior feature information and the local feature information shown in the following table 2 may be added to the feature information, to obtain a first prediction submodel.

TABLE 2

| Group behavior feature information | The group staying duration and the invitation time interval of the first sample user<br>The invitation time interval of the first sample user<br>The quantity of historically invited users of the first sample user that are in the sample group to which the first sample user belongs<br>The quantity of published messages of the first sample user that are in the sample group to which the first sample user belongs |
|---|---|

TABLE 2-continued

| Local feature information | The quantity of first users that are in association relationships and that are in the sample group to which the first sample user belongs, and the proportion of the quantity of first users in the quantity of group users<br>The quantity of second users that are of associated users of the first sample user and that do not exist in the sample group to which the first sample user belongs, and the proportion of the quantity of second users in the quantity of the associated users of the first sample user<br>The quantity of first specified users in the associated users of the first sample user<br>The quantity of association relationships existing between a second specified user in the associated users of the first sample user and users in the sample group to which the first sample user belongs<br>The depth information that is of the first sample user and that is in cascade feature information of the sample group to which the first sample user belongs |
|---|---|

303. Perform training based on the obtained feature information, to obtain the first prediction submodel.

In an implementation, if only the group architecture feature information and the group behavior feature information as in step 301 and step 302 are obtained, model training may be performed. However, to obtain a more instructive model through training, model training may be further performed by using at least one piece of the feature information in the foregoing embodiment in combination with the group architecture feature information and the group behavior feature information, to obtain a first prediction submodel used to predict a target member user, so that a prediction result obtained when the first prediction submodel performs prediction is more precise.

It should be noted that, in the process of performing model training in step 303, training may be performed based on a classification algorithm, and in the training process, classification calculation may be separately performed for each piece of feature information in the foregoing obtained feature information, to obtain a classification key value corresponding to each piece of feature information. Then, a corresponding quantity of directed edges are allocated to each piece of feature information based on big data information corresponding to the sample group, and for each directed edge, a classification key value of feature information corresponding to the directed edge is determined, until a directed graph is generated according to all feature information, the directed graph is stored, and a first prediction submodel including the directed graph is generated. Certainly, the foregoing is only a simple description for the classification algorithm, and there may also be other implementations for the process of performing training based on the classification algorithm. For example, the classification algorithm may be a decision tree classification method, a naive Bayesian classification algorithm, and a classifier based on a support vector machine (SVM). Which classification algorithm is specifically used to perform training is not limited in this embodiment of this application.

304. Use, for the second sample user, the quantity of associated users of the second sample user in a group to which the first sample user belongs, the quantity of associated users of the second sample user identified as active invited users in the group to which the first sample user belongs, and the quantity of connecting blocks including the associated users of the second sample user in the group to which the first sample user belongs, as group relationship feature information of the second sample user.

For an invitee, whether the invitee is invited may be affected by the relationship between the invitee and member users in a group. To make the second prediction submodel obtained through training more precise and the prediction more accurate, the quantity of associated users of the second sample user that can express this relationship and that are in the group to which the first sample user belongs, the quantity of associated users of the second sample user that are in the group to which the first sample user belongs and that are identified as active invited users, and the quantity of connecting blocks including the associated users of the second sample user in the group to which the first sample user belongs may be obtained, to implement model training subsequently.

In this embodiment of this application, the active invited users are users with the quantity of historical invitees greater than the preset quantity. As shown in the following Table 3, the group relationship feature information may be the content shown in Table 3. Assuming that the second sample user is user u, the sample group to which the first sample user belongs is group c, and the preset quantity is 4, the quantity of associated users of user u in group c, that is, the quantity of associated users of the second sample user in the group to which the first sample user belongs, may be determined. Users that are in the associated users of user u and that once invite four persons in group c to enter the group to which the first sample user belongs are obtained as active invited users, and the quantity of users identified as active invited users, that is, the quantity of associated users that are of the second sample user and that are identified as active invited users in the group to which the first sample user belongs, is obtained. The quantity of user groups that may include associated users mutually known by user u in group c is obtained, and the quantity of user groups is used as the quantity of connecting blocks. For example, if user u is associated with user A, user B, user C, and user D in group c, and user A, user B, and user D know each other, a connecting block may include user A, user B, and user D.

TABLE 3

| Group relationship feature information | The quantity of associated users of the second sample user in the group to which the first sample user belongs<br>The quantity of associated users of the second sample user identified as active invited users in the group to which the first sample user belongs<br>The quantity of connecting blocks including associated users of the second sample user in the group to which the first sample user belongs |
|---|---|

The member users included in the group may have similar personal information, for example, belong to the same region, and have similar age. Therefore, in this embodiment of this application, before training is performed based on the obtained feature information, to obtain a second prediction submodel, user personal information of the second sample user and user common feature information of the second sample user may be further obtained. Methods for obtaining user personal information and user common feature information are as the step (1) and step (2).

(1) The Method for Obtaining User Personal Information:

In this embodiment of this application, the user personal feature information includes gender information, age information, and nationality information of the second sample user.

(2) The Method for Obtaining User Common Feature Information:

In this embodiment of this application, the user common feature information is used to indicate the similarity of the personal feature information. Therefore, after the user personal feature information of the second sample user is obtained, user personal feature information that is of the first sample user and that is in the sample group to which the first sample user belongs needs to be obtained. The user personal feature information of the first sample user includes at least gender information, age information, and nationality information. A first proportion of the quantity of users whose gender information in the user personal feature information of the second sample user is consistent with the gender information in the user personal feature information of the first sample user in the user quantity of the second sample users is calculated. A second proportion of the quantity of users whose age information in the user personal feature information of the second sample user is consistent with the age information in the user personal feature information of the first sample user in the user quantity of the second sample users is calculated. A third proportion of the quantity of users whose nationality information in the user personal feature information of the second sample user is consistent with the nationality information in the user personal feature information of the first sample user in the user quantity of the second sample users is calculated. The foregoing first proportion, second proportion, and third proportion are used as the user common feature information of the second sample user.

It should be noted that, in the foregoing embodiment, the personal information of the user may be obtained from a user database of the social application platform according to a user identifier of the user. The specific obtaining method is not limited in this embodiment of this application.

305. Perform training based on the obtained feature information, to obtain the second prediction submodel.

In the process of performing training on the obtained feature information to generate the second prediction submodel, training needs to be further performed based on the group architecture feature information in the foregoing step 301, that is, based on the group architecture feature information and the group relationship feature information, to generate the second prediction submodel. It should be noted that, when the second prediction submodel is generated, the user personal information and the user common feature information may be added to the group relationship feature information. On the other hand, the user personal information and the user common feature information may also be omitted. This is not specifically limited in this application.

It should be noted that, in the process of performing model training in step 305, training may be performed based on a classification algorithm, and in the training process, classification calculation may be separately performed for each piece of feature information in the foregoing obtained feature information, to obtain a classification key value corresponding to each piece of feature information. Then, a corresponding quantity of directed edges are allocated to each piece of feature information based on big data information corresponding to the sample group, and for each directed edge, a classification key value of feature information corresponding to the directed edge is determined, until a directed graph is generated according to all feature information, the directed graph is stored, and a second prediction submodel including the directed graph is generated. Similar to the training process of the first prediction submodel, the training may also be performed based on any classification algorithm. This is not specifically limited in this embodiment of this application.

Figure 6:
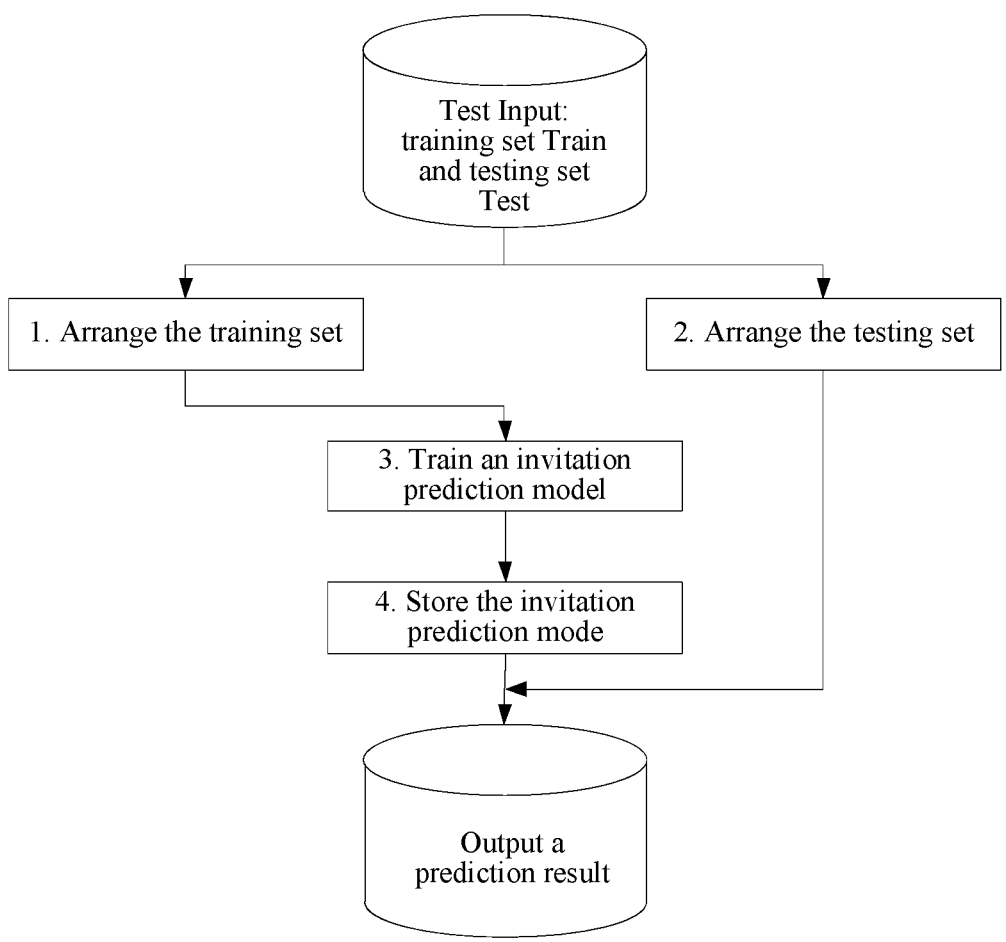
FIG. 6 is a schematic diagram of an invitation behavior prediction method according to an exemplary embodiment.

It should be noted that, after the first prediction submodel and the second prediction submodel are generated, the first prediction submodel and the second prediction submodel may be used as invitation prediction models, so as to perform invitation behavior prediction on the to-be-predicted group subsequently. After the invitation prediction model is generated, the invitation prediction model may be further tested based on a testing set, and the testing set not only includes a plurality of sample groups, but also includes related information of a plurality of invitation behaviors that have occurred, used to measure the prediction precision of the invitation prediction model. That is, referring to FIG. 6, before the training, a training set and a testing set are prepared first, and then the training set and the testing set are arranged. The arrangement may refer to a process of performing feature extraction on samples of the training set and the testing set. Then, the invitation prediction model may be trained. After the training is completed, the invitation prediction model may be stored. After the storing, the invitation prediction model may be further tested, to obtain a target member user and a candidate invitation user. Then, the developer compares invited users with users that are in the testing set and that have performed an invitation behavior, to determine the prediction precision of the invitation prediction model. Certainly, the invitation prediction model may be further adjusted based on the testing set, to improve the prediction precision of the invitation prediction model.

The foregoing step 301 to step 305 are actually processes of training the invitation prediction model, and after the invitation prediction model is obtained through the training, prediction may be performed based on the invitation prediction model, the prediction process may include the following step 306 to step 310:

306. Obtain group behavior feature information of a first user, the group behavior feature information including group staying duration and an invitation time interval of the first user, the invitation time interval being a time interval between the time at which an invitation behavior of the first user occurred last time and the currently predicted time, and the first user being a member user in a to-be-predicted group.

In this embodiment of this application, the process of obtaining the group behavior feature information is consistent with the process of obtaining the group behavior feature information of the first sample user in the foregoing step 302, and is not described herein again.

307. Obtain group relationship feature information of a second user, the second user being an associated user of the first user, and the group relationship feature information being used to indicate an association situation between the second user and the group.

In this embodiment of this application, the process of obtaining group relationship feature information is consistent with the process of obtaining the group relationship feature information of the second sample user in the foregoing step 304, and is not described herein again.

308. Input group architecture feature information of the group and the group behavior feature information of the first user to the first prediction submodel, to obtain the target member user.

When the to-be-predicted group is predicted based on the invitation prediction model, the group architecture feature information and the group behavior feature information of the first user need to be input to the first prediction submodel, so that classification is performed in the first prediction submodel according to the group architecture feature information and the group behavior feature information of the first user, to complete prediction for the target member user of the to-be-predicted group.

Optionally, the first prediction submodel is obtained by at least performing training based on group architecture feature information of a plurality of sample groups in the training set and group behavior feature information of a first sample user in the plurality of sample groups.

309. Input the group architecture feature information of the group and the group relationship feature information of the second user in the group to the second prediction submodel, to obtain the candidate invitation user.

Optionally, the second prediction submodel is obtained by at least performing training by aggregating the group architecture feature information of a plurality of sample groups and group relationship feature information of a second sample user in the plurality of sample groups based on the training set, the second sample user being an associated user of the first sample user.

When the to-be-predicted group is predicted based on the invitation prediction model, the group architecture feature information and the group relationship feature information of the second user in the group need to be input to the second prediction submodel, so that classification is performed in the second prediction submodel according to the group architecture feature information and the group relationship feature information of the second user in the group, to complete prediction for the candidate invitation user.

310. Send invitation prediction information to the target member user, the invitation prediction information being used to prompt the target member user to add the candidate invitation user of the target member user to the group.

In step 309, in fact, invitees are predicted based on associated users of all member users in the to-be-predicted group. However, to transfer the invitation prediction to an actual invitation behavior, the inviter and the invitee need to be associated, so that the invitation behavior has an initiator. Therefore, the process of step 310 needs to be performed, to increase the possibility of the occurrence of the invitation behavior.

In this embodiment of this application, the invitation prediction information may be sent to the target member user at different occasions, for example, the following three sending occasions:

Occasion 1, when it is detected that a terminal of the target member user logs in to a specified application client, the invitation prediction information is sent to the target member user, so that the target member user can receive the invitation prediction information when beginning to use the specified application client.

In this embodiment of this application, the logging in to a specified application client may refer to any of the following situations: situation 1: when it is detected that the terminal of the target member user runs the specified application client in the foreground, it may be determined that the terminal of the target member user logs in to the specified application client; situation 2: when it is detected that the terminal of the target member user enters an account and passwords in the specified application client and succeeds in logging the account, it may be determined that the terminal of the target member user logs in to the specified application client, so that the invitation prediction information may be sent to the target member user. The invitation prediction information may be in the form of "Whether to invite user A to enter group B?".

For example, when it is detected that the target member user clicks to enter the specified application client, the invitation prediction information of "Whether to invite user A to enter group B?" may be displayed on the homepage of the specified application client, and two options of "Yes" and "No" may be provided below the invitation prediction information; and when it is detected that the target member user enters an account and passwords in the specified application client and succeeds in logging the account in to the specified application client, the invitation prediction information of "Whether to invite user A to enter group B?" may be displayed on the login success page of the specified application client, and two options of "Yes" and "No" may be provided below the invitation prediction information.

Occasion 2. When it is detected that the terminal of the target member user opens a specified page of the specified application client, the invitation prediction information is sent to the target member user.

The specified page may be a page specifically used to perform member recommendation or group operations, and the invitation prediction information is sent for example only when the specified page is opened, so that the invitation prediction information is sent only when the recommendation intention of the user is detected, so as to reduce the disturbance to the user.

Occasion 3. When it is detected that the terminal of the target member user opens a session page of the group, the invitation prediction information is sent to the target member user.

To further reduce the disturbance to the user, the invitation prediction information may be sent only when the user opens the session page of the group. In this case, the invitation prediction information may be displayed at the top of the session page, to avoid the impact on an actual session behavior of the user.

The invitation prediction information may provide a function interface for adding the candidate invitation user of the target member user to the group, so that when detecting a trigger operation of the target member user for the invitation prediction information, the terminal directly adds the candidate invitation user to the corresponding group in response to the trigger operation. Certainly, there may be other implementation methods. For example, in response to the trigger operation, information such as a user name of the candidate invitation user may be first displayed, and then, the target member user selects, by using an operation such as a selection operation, whether to add the candidate invitation user to the group. Which manner is specifically used is not specifically limited in this embodiment of this application.

In the method provided in the embodiments of this application, an invitation behavior is predicted by using an invitation prediction model trained based on features that can represent relationships between member users in a group, invitation behaviors of the member users, and the like, so that the social application is more intelligent, and the utilization of an interactive function provided by the group in the social application is maximized.

An optional embodiment of the present disclosure may be formed by using any combination of all the foregoing optional technical solutions, and details are not described herein.

Based on the method provided in the foregoing embodiment, after performing experiments based on the classifier of the SVM, the inventor obtains the following experimental result:

Performing prediction for an inviter is also performing prediction for a target member user based on a first prediction submodel. If $\Delta t=1$ day, that is, it is predicted whether user u in group c invites other users within one day after time T, and testing may be performed based on a testing set, to obtain data shown in Table 4.

TABLE 4

| Features used for model training | AUC | Precision | Recall | F1 |
|---|---|---|---|---|
| Group architecture feature (and other group features) and local structure feature | 91.52 | 82.07 | 84.31 | 83.17 |
| Group architecture feature (and other group features) and group behavior feature | 93.22 | 84.50 | 87.04 | 85.75 |
| All features | 95.31 | 85.95 | 88.39 | 87.15 |

The area under ROC curve (AUC), the Precision, the Recall and the F1 value are four indicators for measuring the prediction precision. The AUC represents the area under an ROC curve, and is used to represent the probability that the trained first prediction submodel arranges a positive sample in front of a negative sample, and a larger AUC represents higher prediction precision of the first prediction submodel. The Precision represents the proportion of actual positive samples in positive samples determined by the first prediction submodel. The Recall represents the proportion of correctly determined positive samples in all positive samples. The F1 value is a value calculated by comprehensively considering the Precision and the Recall.

It is proved in the foregoing experiment that, features such as the group behavior feature, the population statistics feature, and the local structure feature are very important for the prediction of a group invitation behavior, and the model obtained through training has higher prediction precision and strong practical values.

Performing prediction for an invitee is also performing prediction based on a second prediction submodel for the candidate invitation user. If $\Delta t=1$ day, that is, it is predicted whether user u of a neighboring set fringe (c) in group c is invited to enter group c within one day after time T, and testing may be performed according to a testing set, to obtain data of Table 5.

TABLE 5

| Features used for model training | AUC | Precision | Recall | F1 |
|---|---|---|---|---|
| Group architecture feature (and other group features) and group relationship feature | 98.05 | 45.76 | 94.68 | 61.70 |
| Group architecture feature (and other group features), user personal feature, and user common feature information | 89.29 | 11.85 | 76.53 | 20.52 |
| All features | 98.66 | 54.55 | 93.47 | 68.89 |

The AUC, the Precision, the Recall and the F1 value are four indicators for measuring the prediction precision. The AUC represents the area under an ROC curve, and is used to represent the probability that the trained second prediction submodel arranges a positive sample in front of a negative sample, and a larger AUC represents higher prediction precision of the second prediction submodel. The Precision represents the proportion of actual positive samples in positive samples determined by the second prediction submodel. The Recall represents the proportion of correctly determined positive samples in all positive samples. The F1 value is a value calculated by comprehensively considering the Precision and the Recall.

It is proved in the foregoing experiment that, features such as the group relationship feature, the user personal feature, and the user common feature information are very important for the prediction of a group invitation behavior, and the model obtained through training has higher prediction precision and strong practical values.

Figure 7:
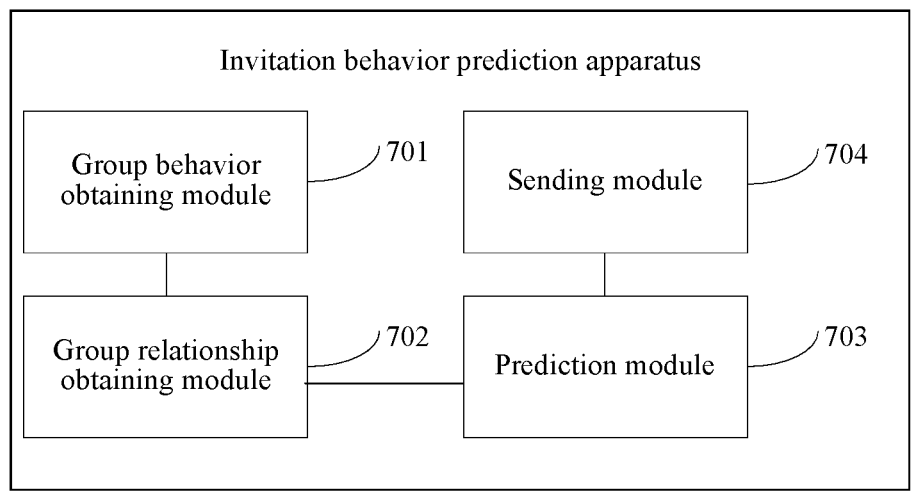
FIG. 7 is a block diagram of an invitation behavior prediction apparatus according to an exemplary embodiment.

FIG. 7 is a block diagram of an invitation behavior prediction apparatus according to an exemplary embodiment. Referring to FIG. 7, the apparatus includes a group behavior obtaining module 701, a group relationship obtaining module 702, a prediction module 703, and a sending module 704.

The group behavior obtaining module 701 is configured to obtain group behavior feature information of a first user, the group behavior feature information including group staying duration and an invitation time interval of the first user, the invitation time interval being a time interval between the time at which an invitation behavior of the first user occurred last time and the currently predicted time, and the first user being a member user in a to-be-predicted group.

The group relationship obtaining module 702 is configured to obtain group relationship feature information of a second user, the second user being an associated user of the first user, and the group relationship feature information being used to indicate an association situation between the second user and the group.

The prediction module 703 is configured to input group architecture feature information of the group, the group behavior feature information of the first user, and the group relationship feature information of the second user to an invitation prediction model, to obtain a target member user and a candidate invitation user of the target member user, the invitation prediction model being obtained by at least performing training based on a plurality of sample groups in a training set and group relationship feature information of associated users of member users in the plurality of sample groups, and the group architecture feature information including association relationships between the quantity of users and the users.

The sending module 704 is configured to send invitation prediction information to the target member user, the invitation prediction information being used to prompt the target member user to add the candidate invitation user of the target member user to the group.

In the apparatus provided in the embodiments of this application, an invitation behavior is predicted by using an invitation prediction model trained based on features that can represent relationships between member users in a group, invitation behaviors of the member users, and the like, so that the social application is more intelligent, and the utilization of an interactive function provided by the group in the social application is maximized.

In another embodiment, the prediction module 703 includes:

a first prediction submodule, configured to input the group architecture feature information of the group and the group behavior feature information of the first user to a first prediction submodel, to obtain the target member user, the first prediction submodel being obtained by at least performing training based on group architecture feature information of a plurality of sample groups in the training set and group behavior feature information of a first sample user in the plurality of sample groups; and a second prediction submodule, configured to input the group architecture feature information of the group, and the group relationship feature information of the second user in the group to a second prediction submodel, to obtain a candidate invitation user, the second prediction submodel being obtained by at least performing training based on the group architecture feature information of a plurality of sample groups in the training set and group relationship feature information of a second sample user in the plurality of sample groups, and the second sample user being an associated user of the first sample user.

In another embodiment, the apparatus further includes an architecture information obtaining module, a behavior information obtaining module, and a first model generation module.

The architecture information obtaining module is configured to obtain, for the plurality of sample groups in the training set, group architecture feature information of the plurality of sample groups according to the user quantity of a second sample user set in the plurality of sample groups and association relationships between first sample users in the plurality of sample groups.

The behavior information obtaining module is configured to use, for the first sample user, the group staying duration and the invitation time interval of the first sample user as the group behavior feature information of the first sample user.

The first model generation module is configured to perform training based on the obtained feature information, to obtain the first prediction submodel.

In another embodiment, the architecture information obtaining module is further configured to extract the user quantity of the second sample user set in the plurality of sample groups; extract the quantity of association relationships existing between first sample users in the plurality of sample groups; extract the quantity of first user groups and the quantity of second user groups in the plurality of sample groups, the first user group being a user group including three first sample users in the plurality of sample groups when the plurality of sample groups is created, and two pairs of first sample users between the three first sample users in the first user group having an association relationship and one pair having no association relationship; and the second user group being a user group including three first sample users in the plurality of sample groups when the plurality of sample groups is created, and any two of the three first sample users in the second user group having an association relationship; extract the quantity of third user groups and the quantity of fourth user groups in the plurality of sample groups, the third user group being a user group including three first sample users in the plurality of current sample groups, and two pairs of first sample users between the three first sample users in the third user group having an association relationship and one pair having no association relationship; and the fourth user group being a user group including three first sample users in the plurality of current sample groups, and any two of the three first sample users in the second user group having an association relationship; determine an aggregation coefficient of the plurality of sample groups, the aggregation coefficient being the proportion of the quantity of fourth user groups in the sum of the quantity of third user groups and the quantity of fourth user groups; and use the user quantity, the quantity of first user groups, the quantity of second user groups, the quantity of third user groups, the quantity of fourth user groups, and the aggregation coefficient as the group architecture feature information of the sample group.

In another embodiment, the behavior information obtaining module is further configured to determine an invitation behavior between first sample users in the plurality of sample groups, and generate cascade feature information of the plurality of sample groups, the cascade feature information being used to indicate an invitation relationship in the sample group; and/or collect statistics about user personal feature information of the first sample users in the plurality of sample groups, to obtain user statistics feature information of the plurality of sample groups.

In another embodiment, the behavior information obtaining module is further configured to use, for the first sample user, the quantity of historically invited users of the first sample user that are in a sample group to which the first sample user belongs, as the group behavior feature information of the first sample user; and/or use, for the first sample user, the quantity of published messages of the first sample user that are in a sample group to which the first sample user belongs, as the group behavior feature information of the first sample user.

In another embodiment, the apparatus further includes a local information obtaining module.

The local information obtaining module is configured to obtain, for the first sample user, local feature information of the first sample user according to an associated user of the first sample user and a relationship between the associated user of the first sample user and a group to which the first sample user belongs.

In another embodiment, the local information obtaining module is configured to use the quantity of first users of the first sample user that have association relationships in the sample group to which the first sample user belongs and the proportion of the quantity of first users in the quantity of group users as the local feature information of the first sample user; and/or, use the quantity of second users in the sample group to which the first sample user belongs and in which associated users of the first sample user do not exist and the proportion of the quantity of second users in the quantity of associated users in the first sample user as the local feature information of the first sample user; and/or, use the quantity of first specified users in associated users of the first sample user as the local feature information of the first sample user, the first specified user being a second sample user having a preset quantity of associated users in the sample group to which the first sample user belongs; and/or, use the quantity of association relationships existing between a second specified user in the associated users of the first sample user and users in the sample group to which the first sample user belongs as the local feature information of the first sample user, the second specified user being an associated user of the first sample user and not belonging to the sample group to which the first sample user belongs; and/or, use depth information of the first sample user in cascade feature information of the sample group to which the first sample user belongs, as the local feature information of the first sample user.

In another embodiment, the architecture information obtaining module is configured to obtain, for the plurality of sample groups in the training set, group architecture feature information of the plurality of sample groups, according to the user quantity of a second sample user set in the plurality of sample groups and association relationships between first sample users in the plurality of sample groups, the second sample user being an associated user of the first sample user.

The apparatus further includes an architecture information obtaining module, a relationship information obtaining module, and a second model generation module.

The relationship information obtaining module is configured to use, for the second sample user, the quantity of associated users of the second sample user in a group to which the first sample user belongs, the quantity of associated users of the second sample user identified as active invited users in the group to which the first sample user belongs, and the quantity of connecting blocks including the associated users of the second sample user in the group to which the first sample user belongs, as group relationship feature information of the second sample user.

The second model generation module is configured to perform training based on the obtained feature information, to obtain the second prediction submodel.

In another embodiment, the apparatus further includes a personal information obtaining module and a common information obtaining module.

The personal information obtaining module is configured to obtain user personal feature information of the second sample user.

The common information obtaining module is configured to determine user common feature information of the second sample user according to the user personal feature information of the second sample user and the user personal feature information that is of the first sample user and that is in the sample group to which the first sample user belongs, the user common feature information being used to indicate the similarity of the personal feature information.

In another embodiment, the sending module is configured to send the invitation prediction information to the target member user when it is detected that a terminal of the target member user logs in to a specified application client; or, send invitation prediction information to the target member user when it is detected that a terminal of the target member user opens a specified page of a specified application client; or, send invitation prediction information to the target member user when it is detected that a terminal of the target member user opens a session page of a group.

Specific manners for modules in the apparatus in the foregoing embodiment to perform operations have been described in detail in the embodiments of the method. Details are not described herein again.

Figure 8:
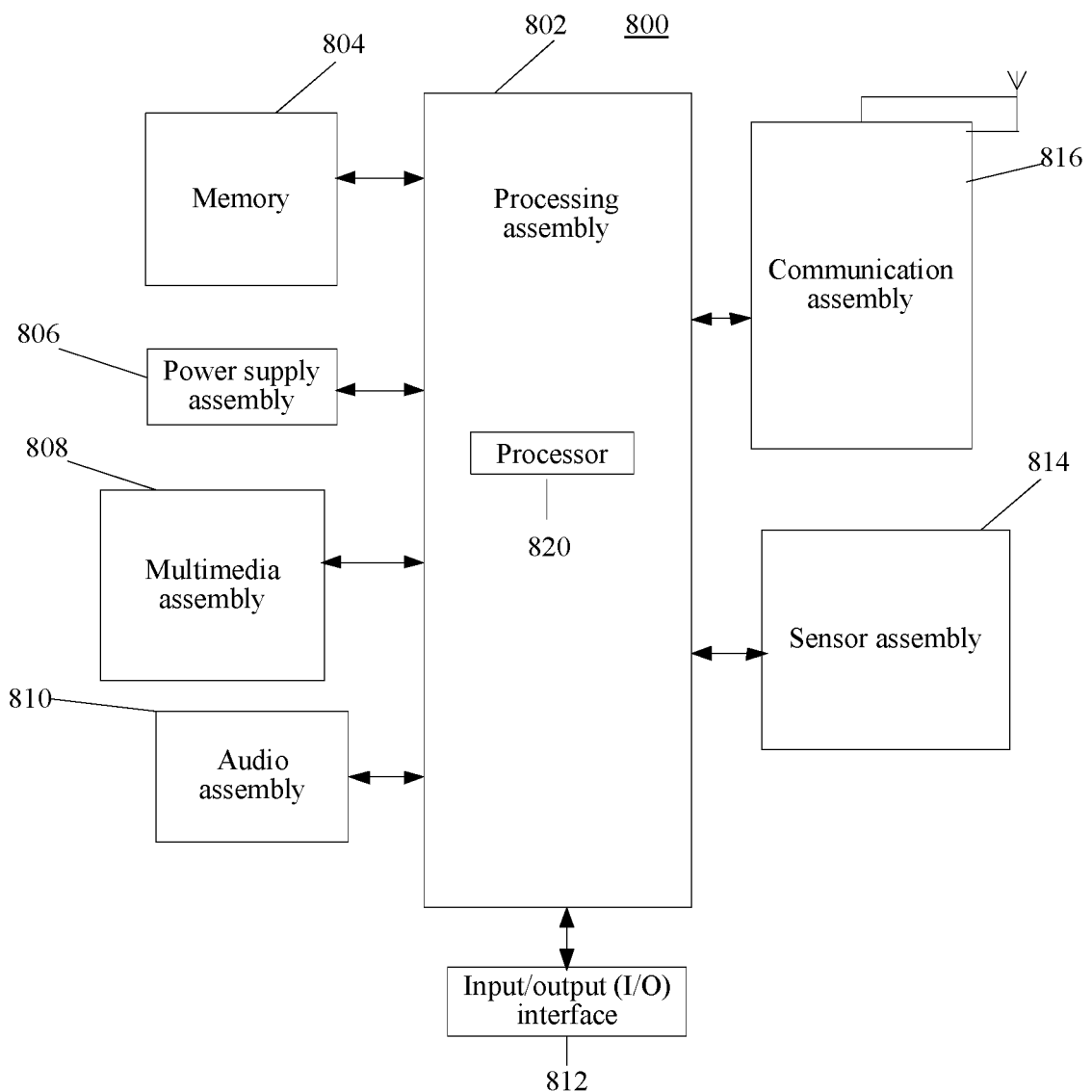
FIG. 8 is a block diagram of an invitation behavior prediction apparatus according to an exemplary embodiment.

FIG. 8 is a block diagram of an invitation behavior prediction apparatus 800 according to an exemplary embodiment. For example, the apparatus 800 may be a mobile phone, a computer, a digital broadcasting terminal, a messaging device, a game console, a tablet device, a medical device, a fitness facility, a personal digital assistant, or the like.

Referring to FIG. 8, the apparatus 800 may include one or more of the following assemblies: a processing assembly 802, a memory 804, a power supply assembly 806, a multimedia assembly 808, an audio assembly 810, an input/output (I/O) interface 812, a sensor assembly 814, and a communication assembly 816.

The processing assembly 802 usually controls the whole operation of the apparatus 800, such as operations associated with displaying, a phone call, data communication, a camera operation, and a recording operation. The processing assembly 802 may include one or more processors 820 to execute instructions, to complete all or some steps of the foregoing method. In addition, the processing assembly 802 may include one or more modules, to facilitate the interaction between the processing assembly 802 and other assemblies. For example, the processing assembly 802 may include a multimedia module, to facilitate the interaction between the multimedia assembly 808 and the processing assembly 802.

The memory 804 is configured to store various types of data to support operations on the apparatus 800. Examples of the data include instructions, contact data, phonebook data, messages, pictures, videos, and the like of any application or method used to be operated on the apparatus 800. The memory 804 may be implemented by any type of a volatile or nonvolatile storage device or a combination thereof, such as a static random access memory (SRAM), an electrically-erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power supply assembly 806 provides power to various assemblies of the apparatus 800. The power supply assembly 806 may include a power supply management system, one or more power supplies, and other assemblies associated with generating, managing and allocating power for the apparatus 800.

The multimedia assembly 808 includes a screen providing an output interface between the apparatus 800 and a user. In some embodiments, the screen may include a liquid crystal display (LCD) and a touch panel (TP). If the screen includes a TP, the screen may be implemented as a touchscreen, to receive an input signal from the user. The TP includes one or more touch sensors to sense touching, sliding, and gestures on the TP. The touch sensor may not only sense the boundary of touching or sliding operations, but also detect duration and pressure related to the touching or sliding operations. In some embodiments, the multimedia assembly 808 includes a front camera and/or a rear camera. When the apparatus 800 is in an operation mode, such as a shoot mode or a video mode, the front camera and/or the rear camera may receive external multimedia data. Each front camera and rear camera may be a fixed optical lens system or have a focal length and an optical zooming capability.

The audio assembly 810 is configured to output and/or input an audio signal. For example, the audio assembly 810 includes a microphone (MIC), and when the apparatus 800 is in an operation mode, such as a call mode, a recording mode, and a voice identification mode, the MIC is configured to receive an external audio signal. The received audio signal may be further stored in the memory 804 or sent through the communication assembly 816. In some embodiments, the audio assembly 810 further includes a loudspeaker, configured to output an audio signal.

The I/O interface 812 provides an interface between the processing assembly 802 and an external interface module. The external interface module may be a keyboard, a click wheel, buttons, or the like. The buttons may include, but not limited to: a homepage button, a volume button, a start-up button, and a locking button.

The sensor assembly 814 includes one or more sensors, configured to provide status evaluation in each aspect to the apparatus 800. For example, the sensor assembly 814 may detect an opened/closed status of the apparatus 800, and relative positioning of the assembly. For example, the assembly is a display and a small keyboard of the apparatus 800. The sensor assembly 814 may further detect the position change of the apparatus 800 or one assembly of the apparatus 800, the existence or nonexistence of contact between the user and the apparatus 800, the azimuth or acceleration/deceleration of the apparatus 800, and the temperature change of the apparatus 80. The sensor assembly 814 may include a proximity sensor, configured to detect the existence of nearby objects without physical contact. The sensor assembly 814 may further include an optical sensor, such as a complementary metal oxide semiconductor (CMOS) or a charge-coupled device (CCD) image sensor, configured to be used in an imaging application. In some embodiments, the sensor assembly 814 may further include an acceleration sensor, a gyroscope sensor, a magnetic sensor, a pressure sensor, or a temperature sensor.

The communication assembly 816 is configured to facilitate communication in a wired or wireless manner between the apparatus 800 and other devices. The apparatus 800 may access a wireless network based on communication standards, such as Wi-Fi, 2G, or 3G, or a combination thereof. In an exemplary embodiment, the communication assembly 816 receives a broadcast signal or broadcast related information from an external broadcast management system via a broadcast channel. In an exemplary embodiment, the communication assembly 816 further includes a near field communication (NFC) module, to promote short range communication. For example, the NFC module may be implemented based on a radio frequency identification (RFID) technology, an infra-red data association (IrDA) technology, an ultra wideband (UWB) technology, a Bluetooth (BT) technology, and other technologies.

In an exemplary embodiment, the apparatus 800 may be implemented by one or more application specific integrated circuits (ASIC), digital signal processors (DSP), digital signal processor devices (DSPD), programmable logic devices (PLD), field programmable gate arrays (FPGA), controllers, microcontrollers, microprocessors, or other electronic components, and configured to perform the foregoing invitation behavior prediction method.

In an exemplary embodiment, an invitation behavior prediction apparatus is further provided, where the invitation behavior prediction apparatus stores a plurality of instructions, and the instructions are suitable for being loaded by a processor to perform the invitation behavior prediction method shown in the foregoing FIG. 2 to FIG. 3.

In an exemplary embodiment, a non-transitory computer readable storage medium including instructions, for example, a memory 804 including instructions, is further provided, and the foregoing instructions may be executed by a processor 820 of the apparatus 800 to complete the foregoing invitation behavior prediction method. For example, the non-transitory computer readable storage medium may be a ROM, a random access memory (RAM), a compact disc read-only memory (CD-ROM), a magnetic tape, a floppy disk, an optical data storage device, or the like.

When the instructions in the storage medium are executed by a processor of the invitation behavior prediction apparatus, the non-transitory computer readable storage medium enables the invitation behavior prediction apparatus to perform the foregoing invitation behavior prediction method.

After considering the specification and practicing the present disclosure, a person skilled in the art would easily conceive of other implementations of this application. This application is intended to cover any variation, use, or adaptive change of this application. These variations, uses, or adaptive changes follow the general principles of this application and include common general knowledge or common technical means, which are not disclosed in the present disclosure, in the art. The specification and the embodiments are considered as merely exemplary, and the real scope and spirit of this application are pointed out in the following claims.

It should be understood that this application is not limited to the precise structures described above and shown in the accompanying drawings, and various modifications and changes can be made without departing from the scope of this application. The scope of this application is not limited by the appended claims.

It is noted that the various modules, submodules, units, subunits, and components in the present disclosure can be implemented using any suitable technology. For example, a module or a unit can be implemented using processing circuitry. In an example, a module or a unit can be implemented using one or more integrated circuits (IC). In another example, a module or a unit can be implemented as one or more processors executing software instructions. In another example, interface circuitry is used to implement a receiving unit (or module) and/or a sending unit (or module).

What is claimed is:

1. A method for invitation behavior prediction, comprising:
   obtaining, via interface circuitry of an apparatus, group behavior feature information of a first user, the group behavior feature information including a group membership duration of the first user in a group of member users and an invitation time interval of the first user, the invitation time interval being a time interval between a time at which a most recent invitation is made by the first user and a current time;
   obtaining, by the interface circuitry, group relationship feature information of a second user, the second user being associated with the first user, and the group relationship feature information being indicative of an association between the second user and the group;
   inputting, by processing circuitry of the apparatus, group architecture information of the group, the group behavior feature information of the first user, and the group relationship feature information of the second user to an invitation prediction model, to obtain a target member user and a candidate invitation user of the target member user, the invitation prediction model being obtained by training the invitation prediction model based on a plurality of sample groups in a training set, and group relationship feature information of associated users of member users in the plurality of sample groups, the group architecture feature information of the group including a user number of the member users in the group and correlations of the users in the group; and
   sending, via the interface circuitry, invitation prediction information to the target member user, the invitation prediction information being configured to prompt the target member user to add the candidate invitation user of the target member user to the group.

2. The method according to claim 1, wherein the inputting further comprises:
   inputting, by the processing circuitry, the group architecture feature information of the group and the group behavior feature information of the first user to a first prediction submodel, to obtain the target member user, the first prediction submodel being obtained by training the first prediction submodel based on group architecture feature information of the plurality of sample groups in the training set and group behavior feature information of first sample users in the plurality of sample groups; and
   inputting, by the processing circuitry, the group architecture feature information of the group, and the group relationship feature information of the second user associated with the first user in the group to a second prediction submodel, to obtain the candidate invitation user, the second prediction submodel being obtained by training the second prediction submodel based on the group architecture feature information of the plurality of sample groups in the training set and group relationship feature information of second sample users associated with the plurality of sample groups, and each of the second sample users being an associated user of one of the first sample users.

3. The method according to claim 2, wherein the training the first prediction submodel comprises:
   obtaining, by the interface circuitry, the group architecture feature information of the plurality of sample groups based on a user number of a second sample user set that is associated with the members users in the plurality of sample groups and associations among the first sample users in the plurality of sample groups;
   determining, by the processing circuitry, the group behavior feature information of the first sample users based on group membership durations and invitation time intervals of the first sample users; and
   training, by the processing circuitry, the first prediction submodel based on the group architecture feature information of the plurality of sample groups and the group behavior feature information of the first sample users, to define the first prediction submodel.

4. The method according to claim 3, wherein the obtaining further comprises:
   extracting the user number of the second sample user set that is associated with the member users in the plurality of sample groups;
   extracting an association number of the associations of the first sample users in the plurality of sample groups;
   extracting a group number of first user groups and a group number of second user groups in the plurality of sample groups, each of the first user groups including three first sample users in the plurality of sample groups when the plurality of sample groups is created, each of the first user groups including two pairs of the first sample users that are associated with each other and one pair of the first sample users that is not associated with each other; and each of the second user groups including three first sample users in the plurality of sample groups when the plurality of sample groups is created, any two of the three first sample users in one of the second user groups having an association with each other;
   extracting a group number of third user groups and a group number of fourth user groups in the plurality of sample groups, each of the third user groups including three first sample users in the plurality of current sample groups, each of the third user groups including two pairs of first sample users that are associated with each other and one pair of first sample users that is not associated with each other; and each of the fourth user groups including three first sample users in the plurality of sample groups, any two of the three first sample users in one of the fourth user groups having an association with each other;
   determining a clustering coefficient of the plurality of sample groups, the clustering coefficient being a ratio of the group number of the fourth user groups and a sum of the group number of the third user groups and the group number of the fourth user groups; and
   determining the group architecture feature information of the plurality of sample groups based on the user number of the second sample user set, the group number of the first user groups, the group number of the second user groups, the group number of the third user groups, the group number of the fourth user groups, and the clustering coefficient.

5. The method according to claim 3, wherein the training further comprises at least one of:
   determining invitation behaviors among the first sample users in the plurality of sample groups, and generating cascade feature information of the plurality of sample groups, the cascade feature information indicating an invitation relationship in the plurality of sample groups; and
   collecting statistics of user personal feature information of the first sample users in the plurality of sample groups, to obtain user statistics feature information of the plurality of sample groups.

6. The method according to claim 3, wherein the training further comprises at least one of:
   determining the group behavior feature information of the first sample users based on a user number of historically invited users of a first sample users that are in the plurality of sample groups to which the first sample users belong; and
   determining the group behavior feature information of the first sample users based on a publication number of published messages of the first sample users that are in the plurality of sample groups to which the first sample users belong.

7. The method according to claim 3, wherein the training further comprises:
   obtaining local feature information of the first sample users based on associated users of the first sample users and relationships between the associated users of the first sample users and the plurality of sample groups to which the first sample users belong.

8. The method according to claim 7, wherein the obtaining further comprises at least one of:
   determining the local feature information of the first sample users based on a user number of a group of the first sample users that belong to the plurality of sample groups and have associated users and a ratio of the user number of the group of first sample users and the user number of the plurality of sample groups;
   determining the local feature information of the first sample users based on a user number of the second sample users that do not belong to the plurality of sample groups and are associated with the first sample users and a ratio of the user number of the second sample users and a user number of associated users of the first sample users;
   determining the local feature information of the first sample users based on a user number of first specified users in the associated users of the first sample users, each of the first specified users being one of the second sample users having a preset number of associated users belonging to the plurality of sample groups to which the first sample users belong;
   determining the local feature information of the first sample users based on an association number of associations between second specified users in the associated users of the first sample users and the users in the plurality of sample groups to which the first sample users belong, the second specified users being associated users of the first sample users and not belonging to the plurality of sample groups to which the first sample users belong; and
   determining the local feature information of the first sample users based on depth information of the cascade characteristic information of the plurality of sample groups to which the first sample users belong.

9. The method according to claim 2, wherein the training the second prediction submodel further comprises:
   obtaining the group architecture feature information of the plurality of sample groups based on a user number of a second sample user set that is associated with the member users of the plurality of sample groups and associations of the first sample users in the plurality of sample groups, each of the second sample users being an associated user of one of the first sample users;
   determining the group relationship feature information of the second sample users based on a first user number of first associated users of the second sample users, the first associated users being in the plurality of sample groups to which the first sample users belong, a second user number of second associated users of the second sample users, the second associated users being identified as active invited users in the plurality of sample groups to which the first sample users belong, and a block number of connecting blocks that are formed by third associated users of the second sample users, the third associated users being in the plurality of sample groups to which the first sample users belong; and
   training the second prediction submodel based on the group architecture feature information of the plurality of sample groups, and the group relationship feature information of the second sample users to define the second prediction submodel.

10. The method according to claim 9, wherein the training the second prediction submodel further comprises:
    obtaining user personal feature information of the second sample users; and
    determining user common feature information of the second sample users based on the user personal feature information of the second sample users and the user personal feature information of the first sample users in the plurality of sample groups, the user common feature information being indicative of a similarity of the personal feature information.

11. An invitation behavior prediction apparatus, comprising:
    processing circuitry configured to:
    obtain, via interface circuitry, group behavior feature information of a first user, the group behavior feature information including a group membership duration of the first user in a group of member users and an invitation time interval of the first user, the invitation time interval being a time interval between a time at which a most recent invitation is made by the first user and a current time;
    obtain, via the interface circuitry, group relationship feature information of a second user, the second user being associated with the first user, and the group relationship feature information being indicative of an association between the second user and the group;
    input group architecture feature information of the group, the group behavior feature information of the first user, and the group relationship feature information of the second user to an invitation prediction model, to obtain a target member user and a candidate invitation user of the target member user, the invitation prediction model being obtained by training the invitation prediction model based on a plurality of sample groups in a training set, and group relationship feature information of associated users of member users in the plurality of sample groups, the group architecture feature information of the group including a user member of the member users in the group and correlations of the users in the group; and send, via the interface circuitry, invitation prediction information to the target member user, the invitation prediction information being configured to prompt the target member user to add the candidate invitation user of the target member user to the group.

12. The apparatus according to claim 11, wherein the processing circuitry is configured to:

input the group architecture feature information of the group and the group behavior feature information of the first user to a first prediction submodel, to obtain the target member user, the first prediction submodel being obtained by training the first prediction submodel based on group architecture feature information of the plurality of sample groups in the training set and group behavior feature information of first sample users in the plurality of sample groups; and input the group architecture feature information of the group, and the group relationship feature information of the second user associated with the first user in the group to a second prediction submodel, to obtain the candidate invitation user, the second prediction submodel being obtained by training the second prediction submodel based on the group architecture feature information of the plurality of sample groups in the training set and group relationship feature information of second sample users associated with the plurality of sample groups, and each of the second sample users being an associated user of one of the first sample users.

13. The apparatus according to claim 12, wherein the processing circuitry is configured to:

obtain the group architecture feature information of the plurality of sample groups based on a user number of a second sample user set that is associated with the member users in the plurality of sample groups and associations among the first sample users in the plurality of sample groups;

determine the group behavior feature information of the first sample users based on group membership durations and invitation time intervals of the first sample users; and train the first prediction submodel based on the group architecture feature information of the plurality of sample groups and the group behavior feature information of the first sample users to define the first prediction submodel.

14. The apparatus according to claim 13, wherein the processing circuitry is further configured to:

extract the user number of the second sample user set that is associated with the member users in the plurality of sample groups;

extract an association number of the associations of the first sample users in the plurality of sample groups;

extract a group member of first user groups and a group number of second user groups in the plurality of sample groups, each of the first user groups including three first sample users in the plurality of sample groups when the plurality of sample groups is created, each of the first user groups including two pairs of the first sample users that are associated with each other and one pair of the first sample users that is not associated with each other; and each of the second user groups including three first sample users in the plurality of sample groups when the plurality of sample groups is created, any two of the three first sample users in one of the second user groups having an association with each other;

extract a group number of third user groups and a group number of fourth user groups in the plurality of sample groups, each of the third user groups including three first sample users in the plurality of current sample groups, each of the third user groups including two pairs of first sample users that are associated with each other and one pair of first sample users that is not associated with each other; and each of the fourth user groups including three first sample users in the plurality of sample groups, any two of the three first sample users in one of the fourth user groups having an association with each other;

determine a clustering coefficient of the plurality of sample groups, the clustering coefficient being a ratio of the group number of the fourth user groups and a sum of the group number of the third user groups and the group number of the fourth user groups; and determine the group architecture feature information of the plurality of sample groups based on the user number of the second sample user set, the group number of the first user groups, the group number of the second user groups, the group number of the third user groups, the group number of the fourth user groups, and the clustering coefficient.

15. The apparatus according to claim 13, wherein the processing circuitry is further configured to perform at least one of:

determining invitation behaviors among the first sample users in the plurality of sample groups, and generating cascade feature information of the plurality of sample groups, the cascade feature information indicating an invitation relationship in the plurality of sample groups; and collecting statistics of user personal feature information of the first sample users in the plurality of sample groups, to obtain user statistics feature information of the plurality of sample groups.

16. The apparatus according to claim 13, wherein the processing circuitry is further configured to perform at least one of:

determining the group behavior feature information of the first sample users based on a user number of historically invited users of the first sample users that are in the plurality of sample groups to which the first sample users belong; and determining the group behavior feature information of the first sample users based on a publication number of published messages of the first sample users that are in the plurality of sample groups to which the first sample users belong.

17. The apparatus according to claim 13, wherein the processing circuitry is configured to:

obtain local feature information of the first sample users based on associated users of the first sample users and relationships between the associated users of the first sample users and the plurality of sample groups to which the first sample users belong.

18. The apparatus according to claim 17, wherein the processing circuitry is further configured to perform at least one of:

determining the local feature information of the first sample users based on a user number of a group of the first users that belong to the plurality of sample groups and have associated users and a ratio of the user number of the group of the first sample users and the user number of the plurality of sample groups;

determining the local feature information of the first sample users based on a user number of the second users that do not belong to the plurality of sample groups and are associated with the first sample users and a ratio of the user number of the second samples users and a user number of associated users of the first sample users;

determining the local feature information of the first sample users based on a user number of first specified users in the associated users of the first sample users, each of the first specified users being one of the second sample users having a preset number of associated users belonging to the plurality of sample groups to which the first sample users belong;

determining the local feature information of the first sample users based on an association number of associations between second specified users in the associated users of the first sample users and the users in the plurality of sample groups to which the first sample users belong, the second specified users being associated users of the first sample users and not belonging to the plurality of sample groups to which the first sample users belong; and determining the local feature information of the first sample users based on depth information of the cascade feature information of the plurality of sample groups to which the first sample users belong.

19. The apparatus according to claim 12, wherein the processing circuitry is configured to:

obtain the group architecture feature information of the plurality of sample groups based on a user number of a second sample user set that is associated with the member users of the plurality of sample groups and associations of the first sample users in the plurality of sample groups, each of the second sample users being an associated user of one of the first sample users;

determine the group relationship feature information of the second sample users based on a first user number of first associated users of the second sample users, the first associated users being in the plurality of sample groups to which the first sample users belong, a second user number of second associated users of the second sample users, the second associated users being identified as active invited users in the plurality of sample groups to which the first sample users belong, and a block number of connecting blocks that are formed by third associated users of the second sample users, the third associated users being in the plurality of sample groups to which the first sample users belong; and train the second prediction submodel based on the group architecture feature information of the plurality of sample groups, and the group relationship feature information of the second sample users to define the second prediction submodel.

20. A non-transitory computer readable storage medium storing instructions which when executed by at least one processor cause the at least one processor to perform:

obtaining group behavior feature information of a first user, the group behavior feature information including a group membership duration of the first user in a group of member users and an invitation time interval of the first user, the invitation time interval being a time interval between a time at which a most recent invitation is made by the first user and a current time;

obtaining group relationship feature information of a second user, the second user being associated with the first user, and the group relationship feature information being indicative of an association between the second user and the group;

inputting group architecture information of the group, the group behavior feature information of the first user, and the group relationship feature information of the second user to an invitation prediction model, to obtain a target member user and a candidate invitation user of the target member user, the invitation prediction model being obtained by training the invitation prediction model based on a plurality of sample groups in a training set, and group relationship feature information of associated users of member users in the plurality of sample groups, the group architecture feature information of the group including a user number of the member users in the group and correlations of the users in the group; and sending invitation prediction information to the target member user, the invitation prediction information being configured to prompt the target member user to add the candidate invitation user of the target member user to the group.

\* \* \* \* \*